United States Patent Office 2,878,099
Patented Mar. 17, 1959

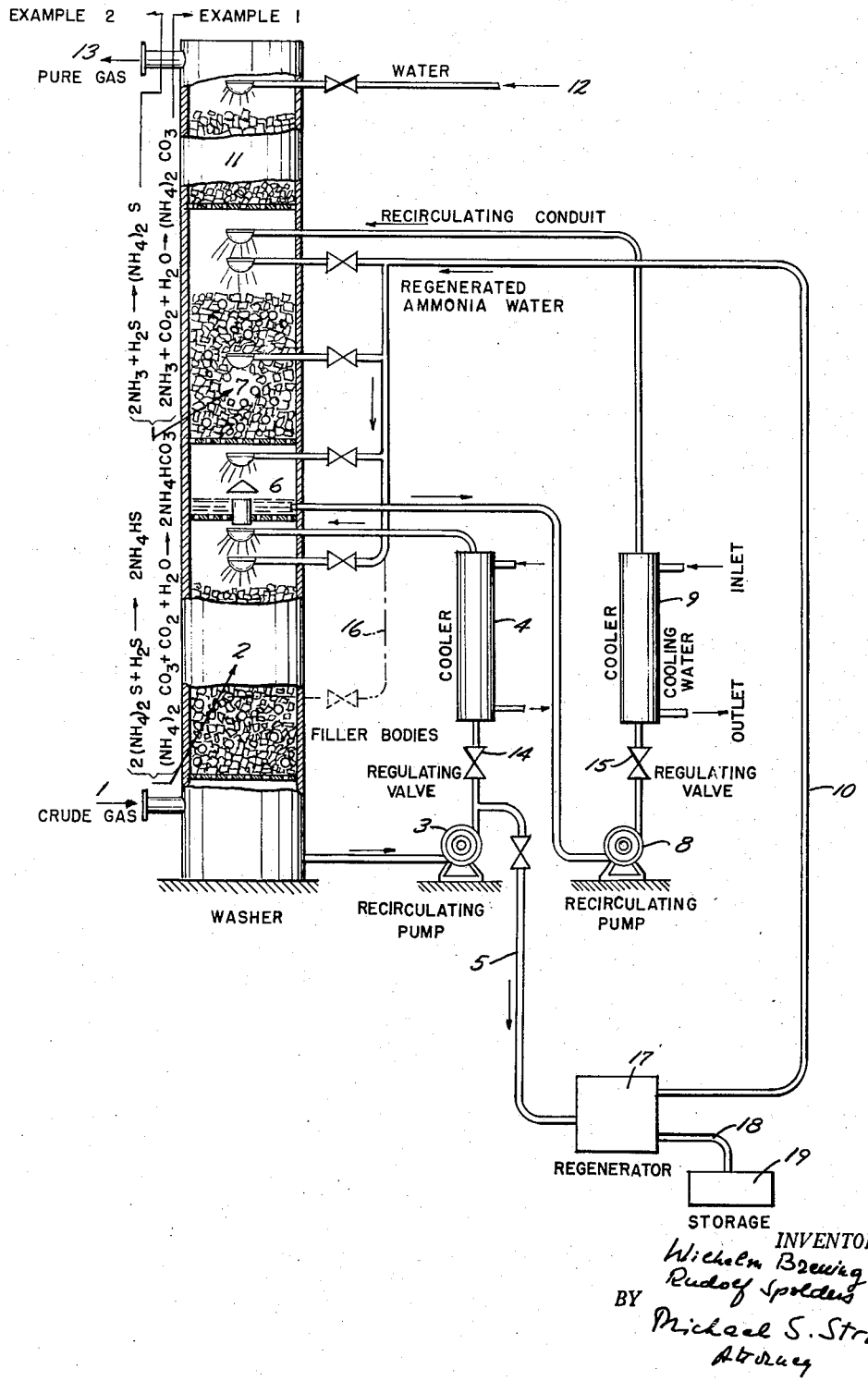

2,878,099

METHOD OF DEACIDIFYING GASES

Wilhelm Breuing and Rudolf Spolders, Bochum, Germany, assignors to Firma Ruhrstahl Aktiengesellschaft, Hattingen an der Ruhr, Germany Application July 22, 1955, Serial No. 523,813

8 Claims. (Cl. 23—2)

The present invention relates to a method of removing gaseous acid constituents from gases containing the same, and more particularly to the removal of gaseous acid-forming constituents such as carbon dioxide and hydrogen sulfide from industrial gases.

It is known that weak acids, especially carbon dioxide, can be removed from industrial gases such as combustion waste gases, exit gas from a blast furnace or coke oven gases, by washing these gases in an ammoniacal solution whereby if necessary these gases may have been previously cleaned of dust and dirt.

Because of the high partial pressure of ammonia it is only possible to work with weak ammonia solutions. Moreover it was necessary to provide for a water wash after the ammonia wash in order to remove the ammonia taken up by the passing gas which is to be de-acidified.

It also has already been tried to add the ammonia which is required for the washing process in gas form to the gas which is to be washed, or to supply the same below the washing installation in which water runs down.

The above-described washing methods have the disadvantage that because of the relatively dilute washing lye the regeneration costs are very considerable and such washing processes are, therefore, uneconomical.

It is therefore a primary object of the present invention to provide a new method of washing out acid-forming constituents from gases whereby all of the disadvantages of the known methods are avoided, and whereby not only is the extent of the washing-out of the acid-forming constituents improved, but the washing out is more economical.

It is another object of the present invention to provide a method of washing out acid-forming constituents, such as carbon dioxide and hydrogen sulfide, from gases containing the same utilizing ammonia as the washing agent and whereby the purified gas does not take up considerable amounts of ammonia.

Other objects and advantages of the present invention will be apparent from a further reading of the specification and of the appended claims.

With the above objects in view, the present invention mainly consists in a method of removing acid constituents from a gas containing the same during passage thereof through a gas washer, comprising the steps of passing a gas containing gaseous acid-forming constituents through a first stage of the gas washer in which an aqueous solution of an ammonium salt adapted to react in the presence of water with the gaseous acid-forming constituents to form the corresponding acid salt thereof is continuously passed in countercurrent and recirculated through the passing gas so as to remove a portion of the gaseous acid-forming constituents from the gas and form the corresponding ammonium acid salt thereof; and passing the gas containing remaining gaseous acid-forming constituents through a subsequent second stage of the gas washer in which an aqueous ammonium hydroxide solution is continuously passed in countercurrent and recirculated through the passing gas at a rate adapted to remove the remaining gaseous acid-forming constituents from the gas while the gas passes through the second stage of the gas washer so as to form the corresponding ammonium salt of the acid-forming constituents thus removing the remaining acid-forming constituents from the gas and obtaining a de-acidified gas.

It has been found according to the present invention that the effect of the gas washing as compared to the known methods can be considerably improved if the washing is carried out with aqueous ammonia solution in two separate washing stages, in each stage of which the washing is so carried out that the washing liquid is continuously passed in countercurrent and recirculated through the passing gas to be purified.

For example, in the case of washing carbon dioxide from a gas, the reactions proceed as follows:

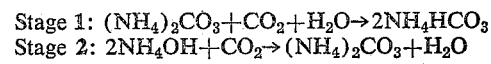

Overall equation:

$$2NH_4OH + 2CO_2 \rightleftharpoons 2NH_4HCO_3$$

It is noted that in the above equations the order of the stages is viewed from the gas which is to be purified. However, since in the actual operation of the method of the invention ammonium hydroxide is the only freshly introduced washing agent and the ammonium carbonate formed by reaction of the ammonium hydroxide with carbon dioxide is used in a separate stage to react with additional carbon dioxide forming ammonium bicarbonate, the order of the stages from the point of view of the washing liquid can be considered as reversed, and stage 1 above may be considered as stage 2, while stage 2 may be considered as stage 1. However, for convenience, the order of the stages shall throughout this application be discussed as above, namely with reference to the introduced gases to be de-acidified.

From the foregoing reaction equations it is apparent that according to the present invention for each molecule of ammonium hydroxide two times the carbon dioxide is bound than according to the hitherto known washing methods. The working tests have shown that it is possible in continuous process for each cubic meter of washing lye to wash out more than 80 normal cubic meters of carbon dioxide, that is a lye-enriching is achieved to an extent that up to now could not possibly be achieved. It has further been shown from the working test that the carbon dioxide can be quantitatively washed out of the gas. Still further it has been found that the concentration of the bicarbonate solution can be increased until the solubility limit, that is until a content of 28% bicarbonate at normal temperature. This means that a wash according to the present invention requires considerably less amounts of solvent than the washing methods according to the known art. Hereby it is also possible to effect a considerable saving in energy in the regeneration of the washing body than was possible according to the known methods.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the drawing schematically illustrates an installation for carrying out the new washing method of the present invention.

Referring more particularly to the drawing, and describing the drawing with reference to the method of the present invention, the carbon dioxide-containing raw gas enters at 1 into the washing tower and is first to a great extent freed of carbon dioxide in the first washing stage 2 by a circulating and recirculating highly concentrated liquor of ammonium carbonate with the formation of bicarbonate. The washing stage 2 may contain solid filler, bodied to aid in the absorption. The liquor is by means of the pump 3 continuously circulated through the indirect cooler 4. The adjusting of the regulating slide valve 14 allows for the adjusting of the speed of the flow of the liquor in the wash zone to achieve optimum results. A portion of the lye which contains carbon dioxide washed out of the gas in the form of highly concentrated bicarbonate solution is drawn-off at branch conduit 5, freed from carbon dioxide in a regeneration installation 17 and thereupon returned to the washing circulation as concentrated ammonia solution through conduit 10. The obtained carbon dioxide is withdrawn from the regenerator 17 through conduit 18 and stored in storage tank 19. This carbon dioxide is in the form of technically pure gas obtained very cheaply and may be used as desired for any purpose.

The pre-washed gas from the first washing stage then streams through the overflow 6 through the second wash stage 7 which may also contain filler bodies. In this second wash stage 7 there is also a repumping recirculating of the washing liquor. The recirculating as well as the regulation of the rate of flow of the liquor is accomplished by the recirculating pump 8 and the regulating valve 15. The carrying-off of the heat of reaction is accomplished by means of indirect cooler 9. In this second washing stage the concentrated ammonia solution which is obtained from the regeneration of the ammonium bicarbonate solution drawn off at 5 is introduced through conduit 10 at a suitable point. The supplying of the ammonia solution is so adjusted that the ammonia and the carbon dioxide before the gas leaves this stage have already reacted to form ammonium carbonate. This has the advantage that practically no ammonia can be taken up by the gas since the addition of ammonia in relation to the carbon dioxide content of the gas is adjustable and thereby the content of free ammonia in the carbonate circulating lye can be maintained below 1%.

It is also possible depending upon the content of carbon dioxide in the gas to conduct a portion of the regenerated highly concentrated ammonia solution to the first washing stage 2 (conduit 16 shown by dotted line). A quantity of this carbonate solution corresponding to the addition of fresh water and strong ammonia water goes continuously to the first washing stage 2 by way of overflow 6.

The gas which has been freed of carbon dioxide then streams through the fresh water stage 11 and leaves the washer at 13 as pure gas. The fresh water is supplied through 12 and serves solely to maintain the solvent concentration of the repumping stages at a constant level. In addition, this stage has the effect of washing out any remaining traces of ammonia in the gas which might be present due to fluctuations in the operation of the washer.

Although the method of the present invention has been described above mainly with respect to the removal of carbon dioxide from gases containing the same, it is to be understood that the present invention is equally adapted adapted to the removal of any other gaseous acid-forming constituents from a gas by reaction thereof in a first stage with a neutral ammonium salt, e. g. in the case of removal of hydrogen sulfide with ammonium sulfide, and reaction in a second stage with ammonium hydroxide. A great advantage of the method of the present invention is that the neutral ammonium salt produced in the second stage by reaction of ammonium hydroxide with the acid-forming constituents can be conducted to the first stage for reaction with acid-forming constituents therein to form the corresponding acid salt. The formed acid salt may then be regenerated to ammonium hydroxide and the ammonium hydroxide reintroduced into the second stage for reaction to remove the acid-forming constituents therein.

Similarly to the removal of carbon dioxide from gases as described above, the present invention is applicable to the removal of other acid-forming constituents such as hydrogen sulfide. This is illustrated by the following equations:

Stage 1: $(NH_4)_2S + H_2S \rightarrow 2NH_4HS$
Stage 2: $2NH_4OH + H_2S \rightarrow (NH_4)_2S + 2H_2O$
Overall equation: $2NH_4OH + 2H_2S \rightleftharpoons 2NH_4HS + 2H_2O$ The regeneration of the enriched washing liquor is carried out by heating in known apparatus. At increased temperatures the salts formed during the washing proceeding are split. The true washing lye ($NH_4OH$) goes back to the washing circulator while the acid gases, whether they are carbon dioxide or hydrogen sulfide, are drawn off at the head of the apparatus and used for any desired purpose. Thus, for example, the carbon dioxide may be transported to compressors to be converted to solid carbon dioxide. The hydrogen sulfide can, for example, be converted to sulfuric acid or to elementary sulfur as desired.

The regeneration according to the present invention of the resulting highly concentrated washing liquors has the additional advantages that the heating of this lye can be carried out by directly flowing in of steam. Because of the high concentration of ammonia it is possible without any further treatment to introduce the steam concentrate into the washing cycle. It is only necessary to reduce the amount of fresh water addition at 12 by the amount of the condensate. Thus, the entire regeneration apparatus can be very simple in its installation since the necessity of expensive indirect heaters is avoided.

The new washing method of the present invention is, however, also suitable if the gas to be purified contains both carbon dioxide and hydrogen sulfide, as in the case, for example, with coke oven gases. The gas washing method of the present invention is then carried out in the manner such that the gas is first freed of carbon dioxide according to the method of the present invention then subsequently freed of hydrogen sulfide according to the method of the present invention. In such case, it is necessary to utilize two washing towers as previously described whereby the gas leaving at the top of the first washer freed of carbon dioxide is introduced at the bottom of the second washer wherein it is freed of hydrogen sulfide.

The following examples are given to further illustrate the method of the present invention, the scope of the invention not however being limited to the specific details of the examples. These examples will be given in conjunction with the attached drawing.

*Example I*

In the apparatus illustrated in the drawing there is introduced through 1 each hour 100 normal cubic meters of blast furnace exit gas which after passing through the two washing stages 2 and 7 and after passing through the fresh water stage of the washer is withdrawn at 13. The exit gas before entering the washer has the following composition:

| | Percent |
|---|---|
| $CO_2$ | 9.1 |
| $H_2$ | 2.8 |
| CO | 31.2 |
| $N_2$ | 56.9 |

This exit gas is previously freed of dust in the usual manner and has before introduction into the washer a temperature of about 24° C. The washer is started with fresh water in such a way that in each of the washing stages 2 and 7 by means of the pumps 3 and 8, 650 liters of liquid are circulated in each stage. When this condition is arrived at, a 7% ammonia water is introduced into the middle of the washing stage 7 through the conduit 10 in an amount of 97.7 liters per hour. In this stage samples of the gas running through are periodically withdrawn during the course of the operation until during the operation the carbon dioxide is washed out of the exit gas to such extent that the carbon dioxide content is reduced to about 0.1% (at different times down to about 0%). The gas contains upon leaving at 13 no ammonia, however the fresh water stage 11 is maintained wet by the addition of water through 12 in order to assure against any possible ammonia passing through this stage. The added amount of water is in an amount of 5 liters per hour.

At 6 the concentration of the ammonium carbonate solution at a temperature of 25° C. amounted in the average to 76% ammonium carbonate.

At 5 there is drawn off each hour about 102 liters of liquor, each liter containing 310 grams of ammonium bicarbonate. In other words, for each cubic meter of washing liquor 88 cubic meters of carbon dioxide are washed out.

The temperature of the gas at the exit 13 is 26° C. The washing liquor has when entering the pumps a temperature of 28° C. and does not have to be cooled in the coolers 4 and 9 since the temperature does not increase further. The operational test is continued for two weeks and shows that with the same proportion the same good washing effects are always achieved.

The regeneration of the washing liquor is carried out in the usual manner by heating in a special column. This washing liquor is after subsequently direct cooling introduced into the washing process at 10. The regeneration results in an ammonia loss of about 3%. This loss is made up by ammonia from the coke oven gas.

*Example II*

This example relates to the removal of both carbon dioxide and hydrogen sulfide from a coke oven gas. For this washing, two washing apparatuses corresponding to the apparatus previously described are arranged one behind the other so that in the first apparatus the carbon dioxide is washed out and in the second apparatus the hydrogen sulfide is washed out.

Coke oven gas is introduced into the apparatus in an amount of 100 normal cubic meters per hour. This coke oven gas has the following composition:

| | | |
|---|---|---|
| $CO_2$ | percent | 2.0 |
| $C_nH_m$ | do | 2.0 |
| $CO$ | do | 6.5 |
| $H_2$ | do | 57.0 |
| $CH_4$ | do | 22.5 |
| $N_2$ | do | 9.5 |
| $H_2S$ | g./Nm³ * | 7.5 |
| $NH_3$ | g./Nm³ | 6.4 |
| $HCN$ | g./Nm³ | 0.17 |

* Normal cubic meters.

The washing out of the carbon dioxide in the first apparatus is carried out in the same way as described in Example I. After this wash, the coke oven gas contains no more carbon dioxide. In this case, also, a 7% ammonia solution is utilized for the washing. The washing liquor drawn off at 5 also contains as in Example I, 310 grams per liter of ammonium bicarbonate. The amount of washing liquor drawn off is naturally less because of the lower carbon dioxide content of the coke oven gases and amounts to 22.7 liters per hour.

The coke oven gas which has been freed of carbon dioxide is then introduced into a second apparatus and herein freed of hydrogen sulfide. As already indicated, this second apparatus is the same as the apparatus used for the carbon dioxide wash. This washing process is carried out such that in the middle of the washing stage 7, 5 liters of 7% ammonia water are introduced per hour. The amount of recirculating lye in both stages 2 and 7 amounts to only 100 liters per hour. The gas enters at a temperature of 22° C. and leaves the washer at the same temperature. In this case also it is unnecessary to utilize an intermediate cooling of the lye.

The washing liquor to be regenerated is drawn off at 5 in an amount of 5 liters per hour. This washing liquor contains 210 grams of ammonium bisulfide per liter. In other words, for each cubic meter of washing liquid, 92.2 normal cubic meters of hydrogen sulfide is washed out.

The fresh water stage is kept dry since the coke oven gas anyhow contains ammonia and is subsequently forwarded from the washer to the ammonia factory. By the washing method of the present invention there is no ammonia loss upon degassing of the washing liquid. The degree of purity of the gases after the wash amounts to 0.6 g. of $H_2S$ per each normal cubic meter.

The resulting hydrogen sulfide obtained by the regeneration of the liquor contains about 4% hydrocyanic acid. If it is desired by means of an installation to convert the resulting hydrogen sulfide, for example, to sulfur, it is necessary to first move the hydrocyanic acid by a brief washing with cold water (at about 1° C.) in order not to interfere with the Claus process. It has already been previously set forth that the hydrocyanic acid converts itself in a reducing oven atmosphere to ammonia and carbon monoxide according to the following equation:

$$HCN + H_2O \rightarrow NH_3 + CO$$

whereby the sulfur because of the formation of bisulfate becomes difficult meltably and furthermore, because of the dark coloring due to the soot formation from the carbon monoxide becomes unsightly.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of removing acid constituents selected from the group consisting of carbon dioxide and hydrogen sulfide from a gas containing the same during passage thereof through a gas washer, comprising the steps of passing a gas containing gaseous acid-forming constituents selected from the group consisting of carbon dioxide and hydrogen sulfide through a first stage of the gas washer in which an aqueous solution of an ammonium salt adapted to react in the presence of water with said gaseous acid-forming constituents to form the corresponding acid salt thereof is continuously passed in countercurrent and recirculated through the passing gas so as to remove a portion of said gaseous acid-forming constituents from said gas and form the corresponding ammonium acid salt thereof; passing said gas containing remaining gaseous acid-forming constituents through a subsequent second stage of the gas washer in which an aqueous ammonium hydroxide solution is continuously passed in countercurrent and recirculated through the passing gas at a rate adapted to remove said remaining gaseous acid-forming constituents from said gas while said gas passes through said second stage of the gas washers so as to form the corresponding ammonium salt of said acid-forming constituents, thus removing said remaining acid-forming constituents from said gas and obtaining a deacidified gas; passing said ammonium salt of said acid-forming constituents formed in said second stage of the gas washer to said first stage of the gas washer for reaction wherein with additional gaseous acid-forming constituents to form the corresponding ammonium acid salt thereof; withdrawing at least a portion of said ammonium acid salt in the aqueous solution from said first stage of the gas washer; regenerating said ammonium acid salt to ammonium hydroxide and said gaseous acid forming constituents; and recirculating the thus regenerated ammonium hydroxide to said second stage of the gas washer.

2. A method of removing carbon dioxide from a gas containing the same during passage thereof through a gas washer, comprising the steps of passing a gas containing carbon dioxide through a first stage of the gas washer in which an aqueous solution of ammonium carbonate is continuously passed in countercurrent and recirculated through the passing gas so as to remove a portion of said carbon dioxide from said gas and form ammonium bicarbonate; passing said gas containing remaining carbon dioxide through a subsequent second stage of the gas washer in which an aqueous ammonium hydroxide solution is continuously passed in countercurrent and recirculated through the passing gas at a rate adapted to remove said remaining carbon dioxide from said gas while said gas passes through said second stage of the gas washer so as to form ammonium carbonate, thus removing said remaining carbon dioxide from said gas and obtaining a de-acidified gas; passing said ammonium carbonate formed in said second stage of the gas washer to said first stage of the gas washer for reaction therein with additional carbon dioxide to form ammonium bicarbonate; withdrawing at least a portion of said ammonium bicarbonate in the aqueous solution from said first stage of the gas washer; regenerating said ammonium bicarbonate to ammonium hydroxide and carbon dioxide; and recirculating the thus regenerated ammonium hydroxide to said second stage of the gas washer.

3. A method of removing hydrogen sulfide from a gas containing the same during passage thereof through a gas washer, comprising the steps of passing a gas containing hydrogen sulfide through a first stage of the gas washer in which an aqueous solution of ammonium sulfide is continuously passed in countercurrent and recirculated through the passing gas so as to remove a portion of said hydrogen sulfide from said gas and form ammonium acid sulfide; passing said gas containing remaining hydrogen sulfide through a subsequent second stage of the gas washer in which an aqueous ammonium hydroxide solution is continuously passed in countercurrent and recirculated through the passing gas at a rate adapted to remove said remaining hydrogen sulfide from said gas while said gas passes through said second stage of the gas washer so as to form ammonium sulfide, thus removing said remaining hydrogen sulfide from said gas and obtaining a de-acidified gas; passing said ammonium sulfide formed in said second stage of the gas washer to said first stage of the gas washer for reaction therein with additional hydrogen sulfide to form ammonium bisulfide; withdrawing at least a portion of said ammonium acid sulfide in the aqueous solution from said first stage of the gas washer; regenerating said ammonium acid sulfide to ammonium hydroxide and hydrogen sulfide; and recirculating the thus regenerated ammonium hydroxide to said second stage of the gas washer.

4. A method of removing acid constituents selected from the group consisting of carbon dioxide and hydrogen sulfide from a gas containing the same during passage thereof through a gas washer, comprising the steps of passing a gas containing carbon dioxide and hydrogen sulfide through a first stage of a first gas washer in which an aqueous solution of ammonium carbonate is continuously passed in countercurrent and recirculated through the passing gas so as to remove a portion of said carbon dioxide from said gas and form ammonium bicarbonate; passing said gas containing remaining carbon dioxide and still containing hydrogen sulfide through a second stage of the first gas washer in which an aqueous ammonium hydroxide solution is continuously passed in countercurrent and recirculated through the passing gas at a rate adapted to remove said remaining carbon dioxide from said gas while said gas passes through said second stage of the first gas washer so as to form ammonium carbonate, thus removing said remaining carbon dioxide and still containing hydrogen sulfide; passing said ammonium carbonate formed in said second stage of the first gas washer to said first stage of the first gas washer for reaction therein with additional carbon dioxide to form ammonium carbonate; passing said gas still containing hydrogen sulfide through a first stage of a second gas washer in which an aqueous solution of ammonium sulfide is continuously passed in countercurrent and recirculated through the passing gas so as to remove a portion of said hydrogen sulfide from said gas and form ammonium acid sulfide; passing said gas containing remaining hydrogen sulfide through a subsequent second stage of the second gas washer in which an aqueous ammonium hydroxide solution is continuously passed in countercurrent and recirculated through the passing gas at a rate adapted to remove said remaining hydrogen sulfide from said gas while said gas passes through said second stage of the gas washer so as to form ammonium sulfide, thus removing said remaining hydrogen sulfide from said gas and obtaining a de-acidified gas; passing said ammonium sulfide formed in said second stage of the second gas washer to said first stage of the second gas washer for reaction therein with additional hydrogen sulfide to form ammonium bisulfide and; withdrawing at least a portion of said ammonium bicarbonate in the aqueous solution from said first stage of said first gas washer, regenerating said ammonium bicarbonate to ammonium hydroxide and carbon dioxide, recirculating the thus regenerated ammonium hydroxide to said second stage of said first gas washer, withdrawing at least a portion of said ammonium acid sulfide in the aqueous solution from said first stage of said second gas washer, regenerating said ammonium acid sulfide to ammonium hydroxide and hydrogen sulfide, and recirculating the thus regenerated ammonium hydroxide to said second stage of said second gas washer.

5. a method of removing acid constituents selected from the group consisting of carbon dioxide and hydrogen sulfide from a gas containing the same during passage thereof through a gas washer, comprising the steps of passing a gas containing gaseous acid-forming constituents selected from the group consisting of carbon dioxide and hydrogen sulfide through a first stage of the gas washer in which an aqueous solution of an ammonium salt adapted to react in the presence of water with said gaseous acid-forming constituents to form the corresponding acid salt thereof is continuously passed in countercurrent, circulated through a cooler and recirculated through the passing gas so as to remove a portion of said gaseous acid-forming constituents from said gas and form the corresponding ammonium acid salt thereof; passing said gas containing remaining gaseous acid-forming constituents through a subsequent second stage of the gas washer in which an aqueous ammonium hydroxide solution is continuously passed in countercurrent, circulated through a cooler and recirculated through the passing gas at a rate adapted to remove said remaining gaseous acid-forming constituents from said gas while said gas passes through said second stage of the gas washer so as to form the corresponding ammonium salt of said acid-forming constituents, thus removing said remaining acid-forming constituents from said gas and obtaining a de-acidified gas, passing said ammonium salt of said acid-forming constituents formed in said second stage of the gas washer to said first stage of the gas washer for reaction therein with additional gaseous acid-forming constituents to form the corresponding ammonium acid salt thereof; withdrawing at least a portion of said ammonium acid salt in the aqueous solution from said first stage of the gas washer; regenerating said ammonium acid salt to ammonium hydroxide and said gaseous acid-forming constituents; and recirculating the thus regenerated ammonium hydroxide to said second stage of the gas washer.

6. A method of removing acid constituents selected from the group consisting of carbon dioxide and hydrogen sulfide from a gas containing the same during passage thereof through a gas washer, comprising the steps of passing a gas containing gaseous acid-forming constituents selected from the group consisting of carbon dioxide and hydrogen sulfide through a first stage of the gas washer in which an aqueous solution of an ammonium salt adapted to react in the presence of water with said gaseous acid-forming constituents to form the corresponding acid salt thereof is continuously passed in countercurrent and recirculated through the passing gas so as to remove a portion of said gaseous acid-forming constituents from said gas and form the corresponding ammonium acid salt thereof; passing said gas containing remaining gaseous acid-forming constituents through a subsequent second stage of the gas washer in which an aqueous ammonium hydroxide solution is continuously passed in countercurrent and recirculated through the passing gas at a rate adapted to remove said remaining gaseous acid-forming constituents from said gas while said gas passes through said second stage of the gas washer while maintaining the content of free ammonia in said aqueous solution in said second stage at below 1% so as to form the corresponding ammonium salt of said acid-forming constituents, thus removing said remaining acid-forming constituents from said gas and obtaining a de-acidified gas, passing said ammonium salt of said acid-forming constituents formed in said second stage of the gas washer to said first stage of the gas washer for reaction therein with additional gaseous acid-forming constituents to form the corresponding ammonium acid salt thereof; withdrawing at least a portion of said ammonium acid salt in the aqueous solution from said first stage of the gas washer; regenerating said ammonium acid salt to ammonium hydroxide and said gaseous acid-forming constituents; and recirculating the thus regenerated ammonium hydroxide to said second stage of the gas washer.

7. A method of removing acid constituents selected from the group consisting of carbon dioxide and hydrogen sulfide from a gas containing the same during passage thereof through a gas washer, comprising the steps of passing a gas containing gaseous acid-forming constituents selected from the group consisting of carbon dioxide and hydrogen sulfide through a first stage of the gas washer in which an aqueous solution of an ammonium salt adapted to react in the presence of water with said gaseous acid-forming constituents to form the corresponding acid salt thereof is continuously passed in countercurrent and recirculated through the passing gas so as to remove a portion of said gaseous acid-forming constituents from said gas and form the corresponding ammonium acid salt thereof; passing said gas containing remaining gaseous acid-forming constituents through a subsequent second stage of the gas washer in which an aqueous ammonium hydroxide solution is continuously passed in countercurrent and recirculated through the passing gas at a rate adapted to remove said remaining gaseous acid-forming constituents from said gas while said gas passes through said second stage of the gas washer so as to form the corresponding ammonium salt of said acid-forming constituents, thus removing said remaining acid-forming constituents from said gas and obtaining a de-acidified gas; washing the thus obtained de-acidified gas with water, passing said ammonium salt of said acid-forming constituents formed in said second stage of the gas washer to said first stage of the gas washer for reaction therein with additional gaseous acid-forming constituents to form the corresponding ammonium acid salt thereof; withdrawing at least a portion of said ammonium acid salt in the aqueous solution from said first stage of the gas washer; regenerating said ammonium acid salt to ammonium hydroxide and said gaseous acid-forming constituents; and recirculating the thus regenerated ammonium hydroxide to said second stage of the gas washer.

8. A method of removing acid constituents selected from the group consisting of carbon dioxide and hydrogen sulfide from a gas containing the same during passage thereof through a gas washer, comprising the steps of passing a gas containing gaseous acid-forming constituents selected from the group consisting of carbon dioxide and hydrogen sulfide through a first stage of the gas washer in which an aqueous solution of an ammonium salt adapted to react in the presence of water with said gaseous acid-forming constituents to form the corresponding acid salt thereof is continuously passed in countercurrent and recirculated through the passing gas so as to remove a portion of said gaseous acid-forming constituents from said gas and form the corresponding ammonium acid salt thereof; passing said gas containing remaining gaseous acid-forming constituents through a subsequent second stage of the gas washer in which an aqueous ammonium hydroxide solution is continuously passed in countercurrent and recirculated through the passing gas at a rate adapted to remove said remaining gaseous acid-forming constituents from said gas while said gas passes through said second stage of the gas washer so as to form the corresponding ammonium salt of said acid-forming constituents, thus removing said remaining acid-forming constituents from said gas and obtaining a de-acidified gas; withdrawing at least a portion of said ammonium acid salt in the aqueous solution from said first stage of the gas washer; passing steam through said solution containing said ammonium acid salt so as to convert said ammonium acid salt to ammonia and said gaseous acid-forming constituents; and recirculating the thus regenerated ammonium hydroxide to said second stage of the gas washer.

References Cited in the file of this patent
FOREIGN PATENTS

| | | |
|---|---|---|
| 271,852 | Great Britain | Nov. 10, 1927 |
| 536,364 | Great Britain | May 12, 1941 |